United States Patent [19]

Leclerc et al.

[11] Patent Number: 5,048,103
[45] Date of Patent: Sep. 10, 1991

[54] METHOD FOR THE AUTOMATIC RESETTING OF IMAGES

[75] Inventors: Vincent Leclerc, Paris; Jean Lienard, Clamart, both of France

[73] Assignee: General Electric CGR S.A., Issy les Moulineaux, France

[21] Appl. No.: 494,395

[22] Filed: Mar. 16, 1990

[30] Foreign Application Priority Data

Mar. 29, 1989 [FR] France .................. 89 04085

[51] Int. Cl.$^5$ .......................... G06K 9/32; H04N 5/32
[52] U.S. Cl. ........................................ 382/44; 382/6; 358/111; 364/413.13
[58] Field of Search ...................... 382/6, 44; 358/111, 358/20; 364/413.13, 414

[56] References Cited

U.S. PATENT DOCUMENTS

| | | | |
|---|---|---|---|
| 4,635,293 | 1/1987 | Watanabe | 382/6 |
| 4,644,582 | 2/1987 | Morishita et al. | 358/111 |
| 4,685,146 | 8/1987 | Fenster et al. | 382/44 |
| 4,858,128 | 8/1989 | Nowak | 382/6 |

OTHER PUBLICATIONS

IEEE 1985 National Aerospace and Electonics Conference—NAECON 1985, vol. 2, May 20-24, 1985, pp. 1395-1398, L. A. Tamburino, "Generalized Interest Operators".

Proceedings of the IEEE Computer Society Conference on Computer Vision and Pattern Recognition, Washington, D.C., Jun. 19-23, 1983, pp. 432-441, F. Glazer, "Scene Matching by Hierarchical Correlation".

Primary Examiner—Leo H. Boudreau
Assistant Examiner—Steven P. Fallon
Attorney, Agent, or Firm—Oblon, Spivak, McClelland, Maier & Neustadt

[57] ABSTRACT

Images representing one and the same scene, but acquired under conditions such taht the subject has moved, are automatically reset by making an automatic selection of a homogenous population of landmarks and by computing the shift vectors associated with these landmarks. It is shown that, in order to select the landmarks, it is worthwhile to characterize the image by a certain number of characteristic mangitudes representing the solidity of these landmarks. The solidity of the landmarks is the ability of a landmark to be the site of an exact measurement of shift for a required precision.

8 Claims, 4 Drawing Sheets

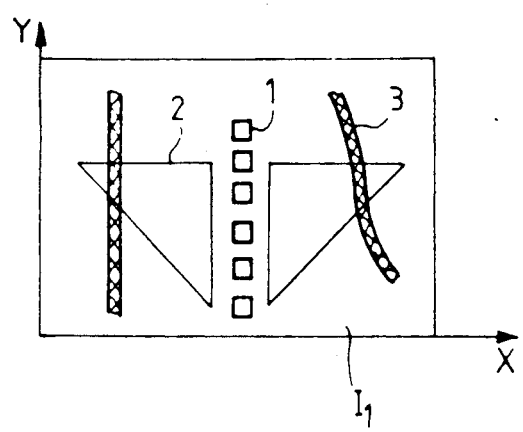
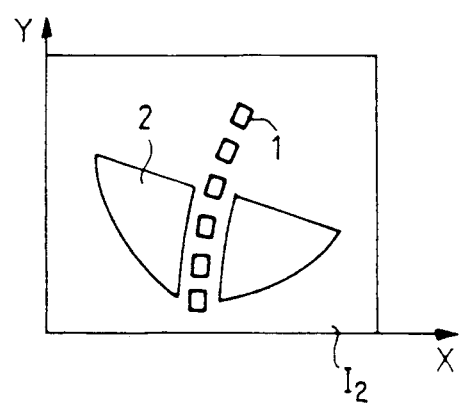
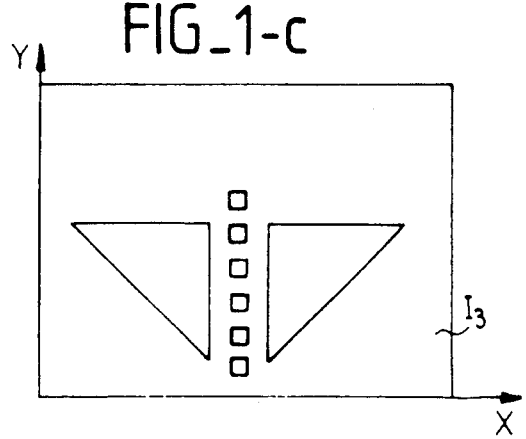
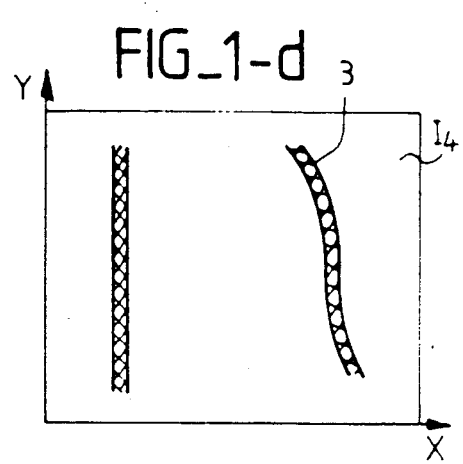
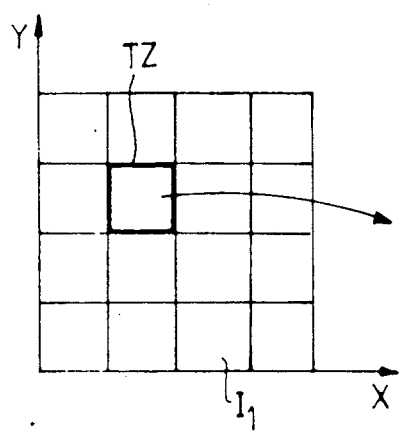
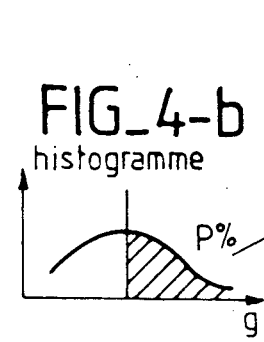
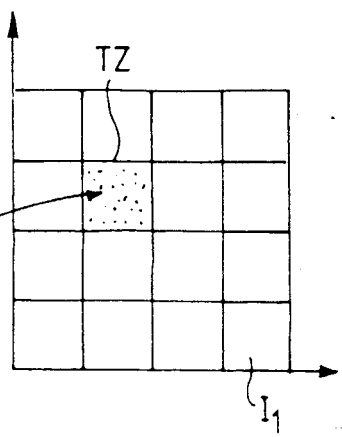

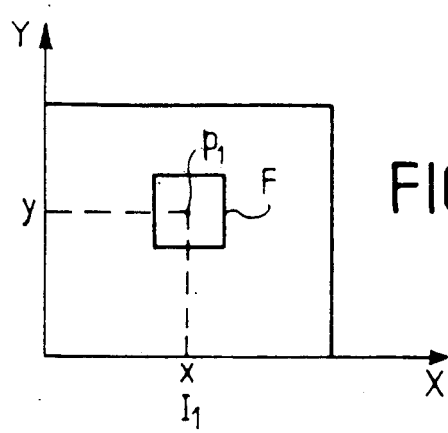
FIG_2-a
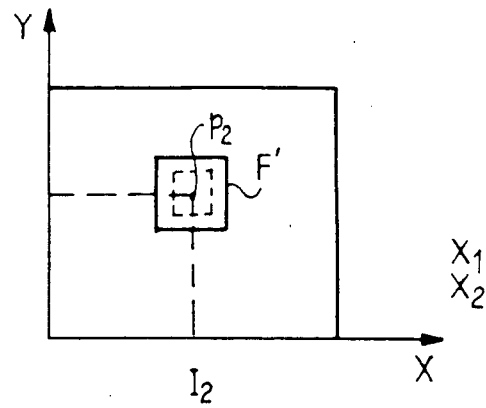
FIG_2-b
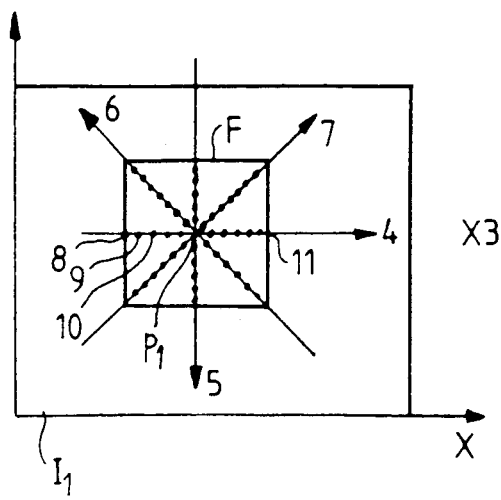
FIG_2-c
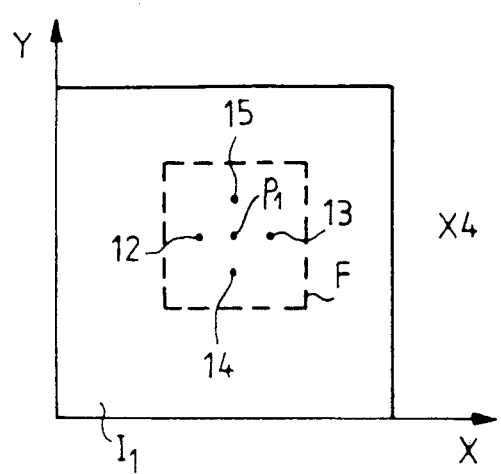
FIG_2-d
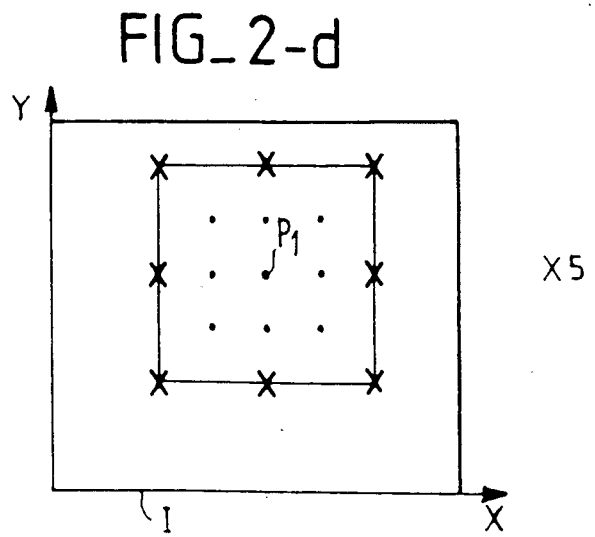

FIG_3
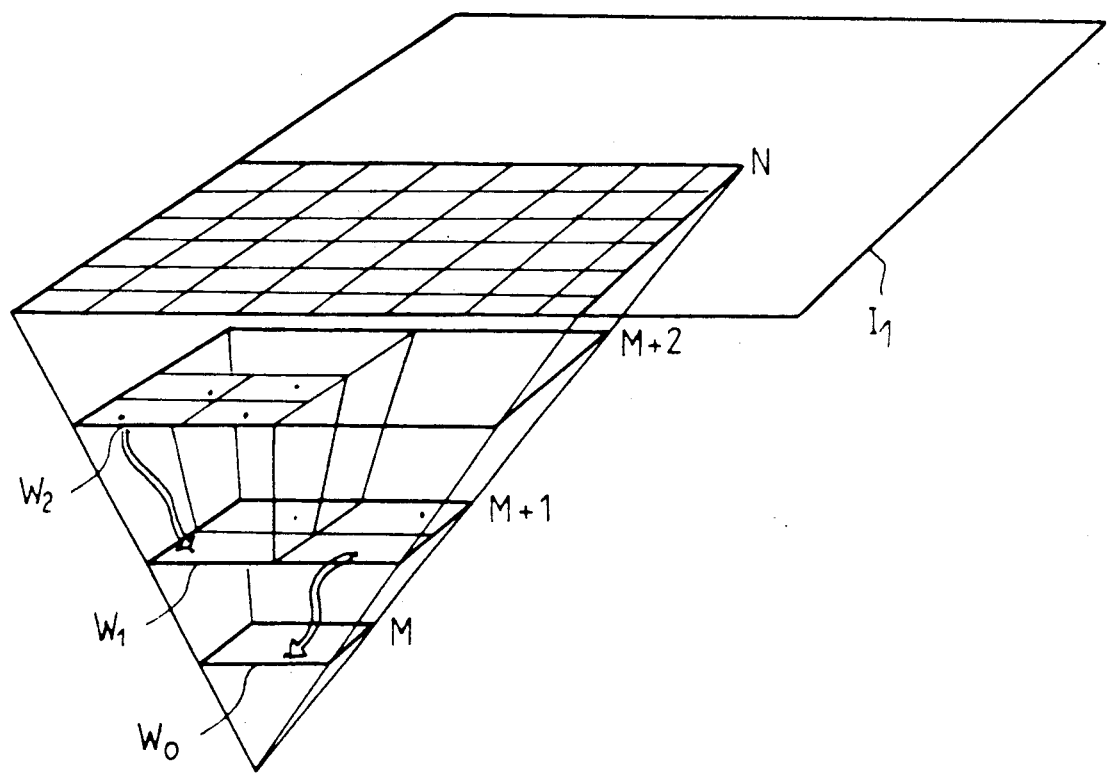
FIG_5
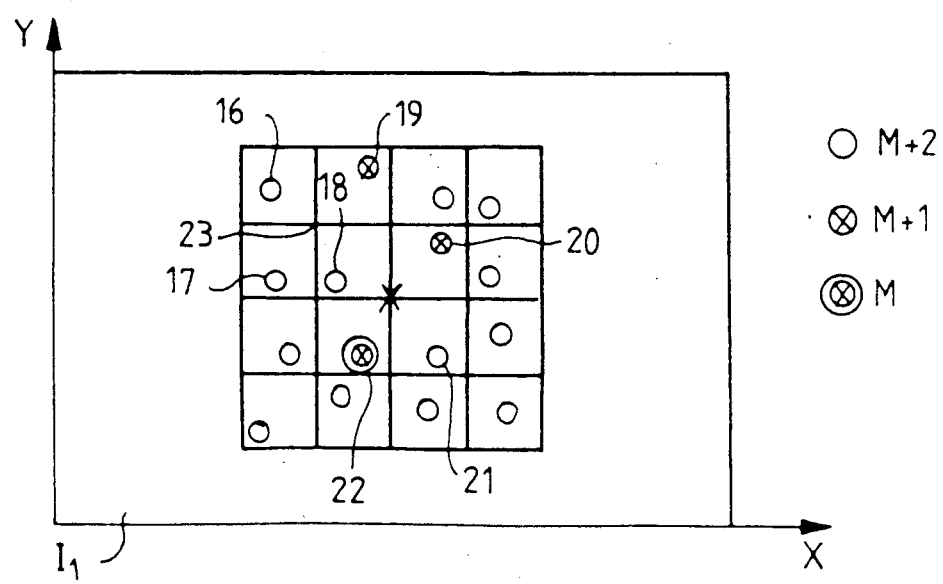

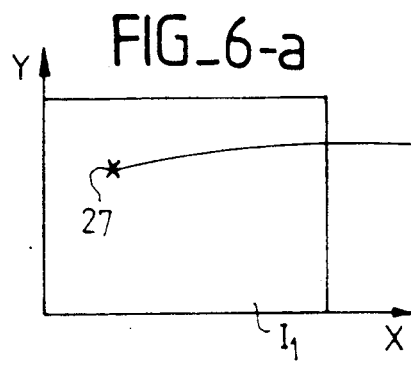
FIG_6-a
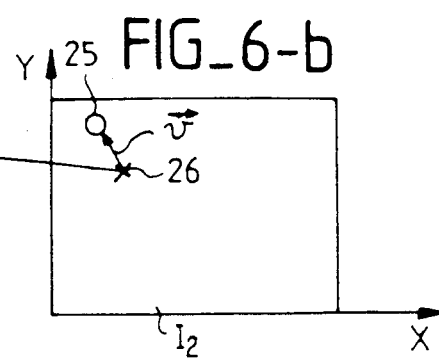
FIG_6-b
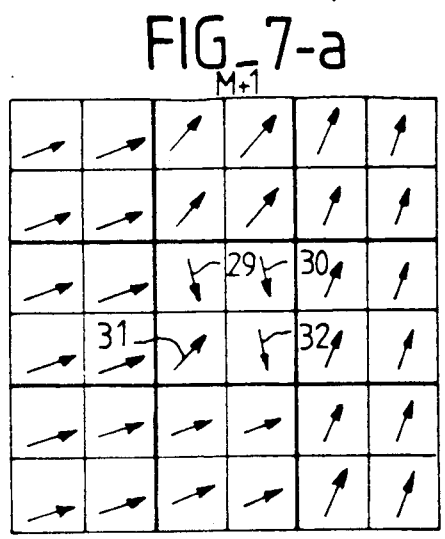
FIG_7-a
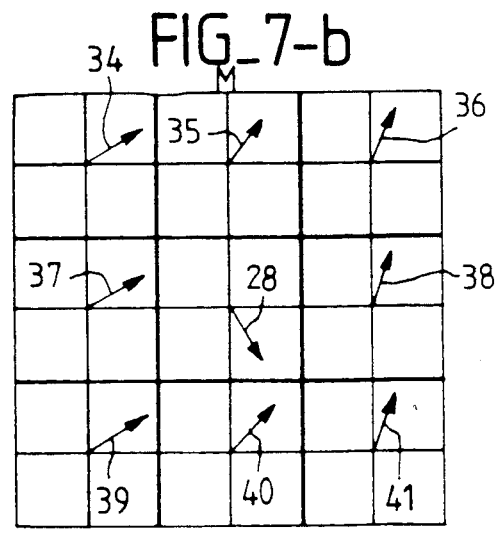
FIG_7-b
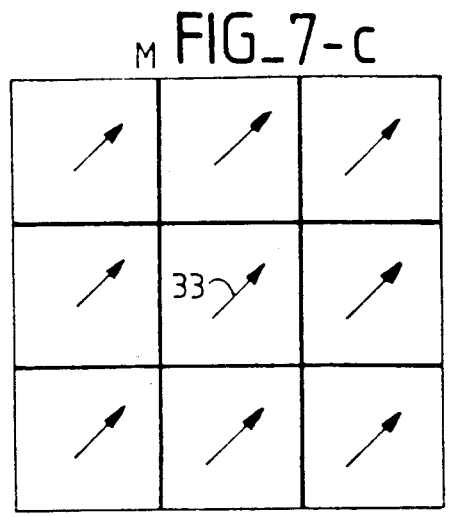
FIG_7-c
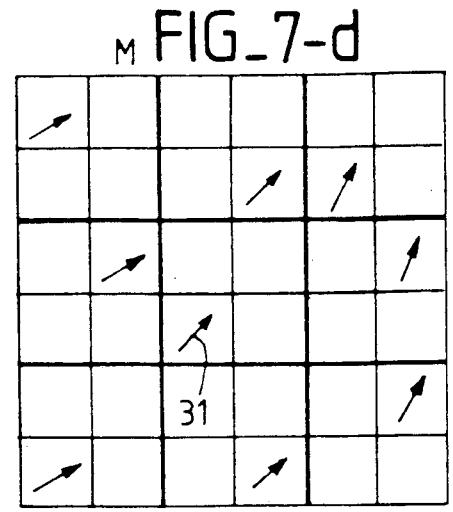
FIG_7-d
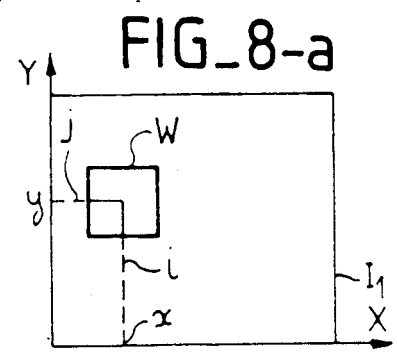
FIG_8-a
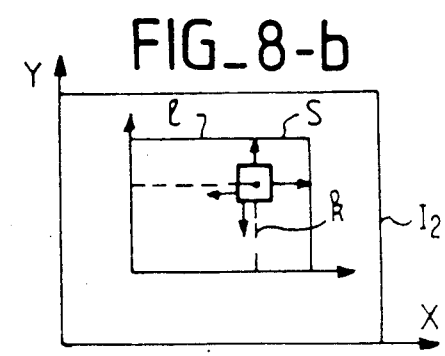
FIG_8-b

METHOD FOR THE AUTOMATIC RESETTING OF IMAGES

BACKGROUND OF THE INVENTION

1. Field of the Invention

An object of the present invention is a method for the automatic resetting of images, that can be used notably to display images. It is designed for use chiefly in the medical field where it is sought to compare images representing the same scenes acquired at different times and/or by different protocols. For example, it is sought to put images acquired by different modes, a tomodensitometry mode and an NMR or gammagraphy mode, into correspondence so as to complement the lessons derived from one image with corresponding lessons derived from another image.

In a more common application, the invention is designed to be implemented in angiography where it is sought to depict the structures of vascularization of the tissues. It is recalled that, in angiography, vascular structures are revealed by the comparison of two images acquired respectively with and without the injection of a contrast product into the blood circulation system of a patient. By then subtracting one image from another, point by point, the image of the vascular structures alone is obtained The problem to be resolved, both here and in the comparison of the images acquired with different protocols, lies in the point-by-point comparison. For a great many reasons (essentially related to the shifting of the patient), the structure is not depicted identically from one image to another, and the point-by-point subtraction of the images produces image artefacts at the edges of the tissue structures shown. A shift of about ten pixels should thus be expected when comparing images obtained by different protocols, while a shift of some pixels can be expected in the acquisition of the angiographic images.

For it to be possible to make a subtraction or point-by-point comparison, it is necessary to correct the distortion undergone by one of the two images, called the mask image or image to be reset, with respect to a first image, called a reference image. Once the distortion of the image to be reset has been corrected, the comparison may be done automatically in a simple way. In angiography, for reasons that are intuitively easy to understand, the reference image (which is not made to undergo any correction of distortion) will preferably be the opacified image obtained after injection of the contrast product in the patient's blood. Naturally, the reference image chosen will be the image containing the sensitive information to which particular attention is being paid.

However, the invention may have uses other than those described in the medical field. It may be used, notably, in factory controls where the comparison of images acquired by different protocols (such as X-rays or ultra-sound) is undergoing development. Although the invention is described herein in a medical application, it can clearly be used in these other fields.

2. Description of the Prior Art

The general method for resetting images is known. This method consists of a series of six operations concerning: the pre-processing of the images, the selection of a number of control points (called landmarks), the estimation of the distortion at each of these landmarks, the validation of these landmarks, the interpolation of the distortion to the entire image, and the restoring of the image in corrected form. The pre-processing of the images generally includes at least one digitization of the image so as to replace a physically visible image by a collection of points, also called pixels, the addresses of which are determined and put into correspondence each time with a gray level, or a level of luminosity, assigned to the points.

The selection of the landmarks should meet a certain number of constraints. Notably, the landmarks should be "solid" and distributed homogeneously. A landmark is said to be solid if it is the site of an exact measurement of shift (for a requisite precision). This means that the control points on which, so to speak, the correction of the distortions must be hinged, should be sure points. They should be easily identifiable and unchangeable references. In this sense, the word "landmark", as originally used by sailors in navigation to refer to a rock protruding above sea level, is sufficiently meaningful of their function. Furthermore, the landmarks should be distributed homogeneously. If the landmarks are distributed homogeneously, the modelizing of the distortion will be of good quality at every point of the image. The landmarks should also comply with a constraint of density. The density represents simply the number of landmarks chosen for the image. It will be understood that the greater the number of landmarks, the finer and more precise will be the correction of distortions. However, a large number of landmarks entails, at the same time, a distortion correcting computation which is also heavy. In general, the density is fixed beforehand, depending on an accepted cost of computation.

After the selection of the landmarks in the reference image, a search is made for the position of their corresponding landmarks in the image to be reset. In doing this, a measurement is made of the relative positions between the landmarks and their corresponding landmarks, and the shifts resulting from the distortion are deduced. These shifts are then interpolated to the entire image, and the image to be reset is restored as a function of the interpolated shifts.

An image-resetting scheme such as this has already been proposed. The worth of a method such as this lies in its automatic character. This means that the correction of the images will be done without human intervention. All the work is done by a computer. In practice, automatic methods fail at the stage for selecting and the stage for validating the landmarks. Rather than being performed automatically, these stages of selection and validation are then done manually. In this case, an operator has to intervene to designate the landmarks to be chosen. This manual stage, naturally, has to be ruled out for common use as it calls for a competent operator and requires time which a user often lacks. If the manual intervention is not done, the resetting of the image is poor and, in angiography especially, the images obtained by subtraction then have artefacts at the edges of the structures. The problem to be resolved for the automatic selection and validation of the landmarks is that of choosing only the worthwhile landmarks. The worth or utility of a landmark depends on its solidness. This quality may be expressed in terms of an error EQM attached to each landmark and may be written as follows:

$$EQM = d(V, \hat{V}) = |V - \hat{V}|$$

In this expression, V is the true shift, and $\hat{V}$ is its estimation. For, the true shift V is never known. All that can be done, in seeking the correspondent of a landmark, is to make an estimation, by measurement, of its shifting. And the landmark chosen is all the more worthwhile or useful as this estimation is close to the true shift, namely as EQM is small. We then confront a problem that is difficult to resolve, namely the problem of choosing solid landmarks as a function of their associated true shift (which is never known) and of an estimation of this shift (which is not known for as long as the landmark has not been chosen). The approach wherein this error is computed for all the potential landmarks of the image, that is, ultimately, for all the points of the image, is unusable. It leads to an excessively large mass of computations. For, the computations for estimating the shifts of the landmarks are too lengthy. The approach that has been invented consists, then, in making a prediction of which landmarks will be worthwhile or useful as opposed to the other points of the image which will be rejected.

It is an object of the invention, therefore, to propose a method of prediction of this type. It is possible, in this method, to state, automatically and beforehand, which landmarks will be the most solid and the most homogeneous ones. Essentially in the invention, the solidity of the landmarks is characterized by computations of magnitudes done on the entire image. Using these computed magnitudes, or a combination of them, a prediction is made of the landmarks to be chosen, for which this combination meets a criterion. The principle of the invention, based on the prediction, amounts, then, to the preparing of a tool of measurement, the results of which can be likened to a good prediction. The validity of the method of the invention has been verified.

Furthermore, to guarantee the homogeneity of the distribution of the landmarks, there is a provision in the invention for an arborescent, quadtree type of sub-sampling of the reference image so that, from four neighboring landmarks belonging to four square windows placed in a bigger square, only one landmark representing this square is chosen. Continuing thus, hierarchically, the number of landmarks is reduced while, at the same time, the homogeneity of their distribution is preserved even if, at certain positions of the image, there are landmarks that are less solid than landmarks at other places of the image. In these other places of the reference image, too many landmarks would have been selected if the sole criterion set for selecting them had been their solidity.

Thus, at the time of the operation for the sub-sampling the landmarks, we shall not necessarily take into account the most solid landmark of those in the four windows but, preferably, the landmark with the lowest "cost of transition". The term "cost of transition" is applied to a combination of magnitudes representing, firstly, the solidness of the landmark and, secondly, the place of this landmark with respect to the center of the square containing the four windows to which it belongs. It can be shown that this choice is also such that it will render automatic the prior art manual procedures wherein, at one moment or another, it was necessary to manually re-introduce landmarks at certain important places in the images.

SUMMARY OF THE INVENTION

An object of the invention, therefore, is a method for the automatic resetting of images wherein a resetting is done of a second image, called a mask image, distorted with respect to a first image, called a reference image, each image having points and being defined as a collection of addresses of these points, each address being associated with a gray level, said method including the following steps:

a selection is made, preferably in the first image, of a set of landmarks;

a search is made for the correspondents of these landmarks, respectively, in the second image, i.e. preferably in the mask image.

an assessment is made of the shifts undergone by the selected landmarks of the first image with respect to the corresponding searched-for landmarks of the second image;

one of the images, preferably the second image, is restored by correcting the position or gray level of the points of this image in taking into account the shifts of the landmarks located in the neighborhood of these points;

wherein, to make the selection, an assigning is done, to points of the first image, of a computed magnitude or of computed magnitudes characteristic of the solidity and of the homogeneity of distribution of points of this image liable to act as landmarks;

a sorting-out is done of the landmarks to be chosen as a function of the meeting of a criterion by a combination of the magnitudes at these points.

According to another form, the invention is essentially characterized in that the landmarks are selected hierarchically. Preferably, even this hierarchical selection is combined with a sorting-out of the landmarks to be chosen according to the meeting of a criterion by a combination of their magnitudes.

BRIEF DESCRIPTION OF THE DRAWINGS

The invention will be understood more clearly from the following description and from the examination of the accompanying figures. These figures are given purely by way of indication and in no way restrict the scope of the invention. In particular, the application to medical engineering cannot constitute a restriction of the field of invention. Of these figures:

FIGS. 1a to 1d show a schematic view of the implementation of an image resetting method;

FIGS. 2a to 2d show a schematic view of the magnitudes that are computed in the invention and are characteristic of the solidity of the landmarks in the first image;

FIG. 3 gives a schematic view of the hierarchical selection of the landmarks;

FIGS. 4a to 4c give a simplified view of a pre-selection of the landmarks according to the invention;

FIG. 5 is a drawing showing the principle of the hierarchical selection of the landmarks;

FIGS. 6a to 6b give a schematic view of the principle of computation of the shifts;

FIGS. 7a to 7d show an improvement of the invention enabling a validation of the chosen landmarks;

FIGS. 8a–8b gives a schematic view of the particular features of the computation of the shifts associated with the landmarks.

DETAILED DESCRIPTION OF THE INVENTION

FIGS. 1a to 1d represent the image resetting method implemented in the invention. To implement this method, there are two images available, namely a first image $I_1$ and a second image $I_2$: respectively FIGS. 1a and 1b. In a particular example, the image $I_1$, called a reference image, has a system 3 of blood vessels in addition to bone structures 1 or pulmonary structures 2. These blood vessels have been opacified by contrast product and have been revealed more particularly, during a radiology experiment, by the injection of a contrast product into the patient's blood. The image $I_2$ represents the same elements for the same patient when the contrast product had not been injected and when the patient had moved. Each of the two images is shown in a reference system X Y which is the same. The aim of the invention is to produce, in the place of the image $I_2$, an image $I_3$ (FIG. 1c) wherein the distortion of the structures 1 and 2 has been repaired to its shape in the image $I_1$. Of course, in angiography, the content of the image $I_3$ is then subtracted from that of the image $I_1$ so that, in an image $I_4$, only the vascular structures 3 being searched for are revealed. But in other uses of the invention, for example in the comparison of images acquired according to different protocols, it is possible to exploit the reset images in every desired way. It is possible, for example, to make automatic statistical searches in corresponding regions of images. It may also be wished to look at one image in the transparency of the other image.

In the invention, as in the prior art, a pre-processing of the images is done. This pre-processing includes, notably, a digitization of the images. We shall return, subsequently, to certain specific features, in the invention, of this pre-processing operation which contributes more efficiently, in this invention, to the success of the resetting operation, although pre-processing operations of this type are already known per se.

To give a clear picture, it shall be assumed that the digitized image has a resolution expressed in number of points. In a non-restrictive example, the number of points of the image shall be $512 \times 512$. This numerical example can be transposed to any other value whatsoever, but it will enable the explanation of the invention to be simplified. It is therefore assumed that we have, available, the reference image $I_1$ and the mask image $I_2$ each resolved in 512 points $\times$ 512 points. In a first stage, it is assumed that all the points of the reference image may act as landmark points. The reference image is used to define the landmark points rather than the mask image, given that it is preferred to assess the shifts of the mask image with reference to the positions of the landmark points of the reference image. Then, furthermore and preferably, the masked image is restored. However, it is possible to act differently by computing the landmark points on the masked image, assessing the shifts accordingly and correcting either the mask image or the reference image.

The potential landmarks thus defined are too many to be capable of being efficiently processed. It is therefore necessary to extract those landmarks that will subsequently be reputed to be the most solid ones. The problem at this level, therefore, is really to predict which of these $512 \times 512$ landmarks will truly be the landmarks that can be relied upon for performing the restoration. To this end, in the invention, we have characterized the image by preparing computed physical magnitudes, the significance of which represents the sturdiness of the landmarks. A sorting out is then done, among the potential landmarks, of the landmarks to be chosen as a function of a combination of these magnitudes meeting a criterion. As a corollary to this approach, it will be ascertained by a Student test that this approach is coherent and that, therefore, the prediction criteria chosen a priori and represented by the magnitudes of the invention, correspond precisely to reality.

FIGS. 2a to 2d give a schematic view of the preferred magnitudes prepared to measure the solidity of the potential landmarks In the rest of this explanation, these magnitudes are called $X_1$, $X_2$, $X_3$, $X_4$ and $X_5$. FIG. 2a enables an understanding of the computation of the magnitudes $X_1$ and $X_2$. The magnitude $X_1$ is the ratio of the means of the gray level, respectively computed on the reference image $I_1$ and on the image to be reset $I_2$. For example, at a point $P_1$ with coordinates x y in the image $I_1$, associated with a gray level $n_1$, it is possible to superimpose, in the image $I_2$, a point $P_2$ with the same coordinates x and y in this image, but with a gray level in this image $n_2$. In a window F framing $P_1$ (preferably, the window F is centered on $P_1$), it is possible to compute the mean $m_1$ of the gray levels $n_1$. In a window F', superimposable on the window F, it is possible to compute the mean $m_2$ of the gray levels of the neighboring points of $P_2$ in the image $I_2$. It will be said that $X_1$ is expressed as follows.

$$X_1 = |2(m_2 - m_1)/m_1 + m_2)|$$

That is, $X_1$ is the standardized ratio of the difference of the means, in the mask image and in the reference image, of the gray levels. Preferably, the window F' has the same size as the window F. But it is possible to imagine that these windows are not exactly superimposable or even that the points $P_1$ and $P_2$ are not exactly centered therein.

Just as in the windows F it was possible to compute the standardized ratio of the means, so it is possible to make a computation, in the window F of the image $I_1$, of the standard deviation $X_2$ of the statistical distribution of the gray levels of the points contained in this window. Under these conditions, $X_2$ is written in the following way:

$$X_2 = \sqrt{\sum_i (n_{1,i} - m_1)^2}$$

In practice, the dimension of the window F is such that the window F has 256 pixels of the $512 \times 512$ image.

The following is the physical meaning of $X_1$: $X_1$ indicates that there is a very great dissimilarity in mean gray level between the reference image and the mask image. In practice, the landmarks for which the value of $X_1$, thus measured, is too high will not be chosen.

Similarly, $X_2$ informs us of the presence of tissue structures capable of giving good landmarks. The greater $X_2$ is, the more structures there are. For, if we are right in the middle of a tissue, all the neighboring points have almost the same level of gray. The standard deviation is small. By contrast, if we are near the edges of structures, the neighborhood of a point undergoes great variations in the gray level, and the population of the points in each of these gray levels is greater, and the standard deviation measured is then greater. Great magnitudes $X_1$ and $X_2$ therefore provide information about the presence of good landmarks.

The third value $X_3$ is the useful value known as the Moravec value. It has been described in a publication entitled "TOWARDS AUTOMATIC VISUAL OBSTACLE AVOIDANCE", 5TH PROCQ., JOINT CONF. ARTIFICIAL INTELL., CAMBRIDGE, MA, AUGUST 1977, page 584. To prepare this useful value, we consider the four main directions of a small window F centered on the potential landmark $P_1$ of the reference image $I_1$. The four main directions are the horizontal 4, the vertical 5, and the two diagonals 6 and 7. In each direction, we compute the sum of the differences squared of the gray level of a pixel and its neighbor. Thus, for example, in the direction 4, we compute the difference between the gray level attributed to the pixel 8 and the gray level attributed to the pixel 9 which neighbors it. This difference is squared. Then the squared difference in the gray level between the pixel 9 and the pixel 10 is added to it, the pixel $I_0$ being the neighbor, in the direction 4, of the pixel 9. This operation is continued until the pixel $I_1$ which is at the edge of the window F in the direction 4. The same sum is computed for each of the other directions 5, 6 and 7 of Moravec. Then the minimum of each of these four sums is assigned to $X_3$. The physical significance of the value $X_3$ lies then in characterizing the presence of the peaks in terms of gray level in the structures by opposition to the contours or ridge lines. The Moravec useful value can be computed in more than four directions, for example in taking four other bisecting directions between the first four directions. The fact of taking the minimum value means that, once a contour is encountered and once it is substantially oriented like any one of the directions of Moravec, it is precisely the changing of the value of the gray levels on this contour that will be chosen because this changing of the gray levels on this contour is small. In other words, a low value $X_3$ indicates that a contour has been found or even that we are in the middle of a structure. By contrast, if we are dealing with peaks, the values $X_3$ will be high. For, in this case, in all the directions, the change in the gray levels will be high. It is understood that a landmark will be all the more worthwhile or useful as it corresponds to a peak in gray levels, namely to a high Moravec value.

FIG. 2c gives a schematic view of the computation of the magnitude $X_4$ representing the standard of the gradient at the central point $P_1$ of the window F. Preferably, this standard of the gradient is computed on the direct neighborhood of the potential landmark $P_1$. This means that, to the absolute value of the difference in the gray levels between the points 12 and 13, respectively to the left and the right, directly, of the point $P_1$, we add the absolute values of the differences in gray levels between the points 14 and 15, respectively directly beneath and above the point $P_1$. Contrary to the Moravec useful value, the magnitude $X_4$ promotes the participation of the structure contours as landmarks. For, at the position of a contour, at least one of the two absolute values of the differences in the gray levels of neighboring pixels is high: it is the one that is perpendicular to the contour.

The fifth magnitude $X_5$ is equal to the value of the damping coefficient of the self-correlation function, modelized by an exponential function, at the position of the center of a window. Preferably, this self-correlation function is computed only in eight points around the potential landmark for which it is sought to assess the magnitude $X_5$. The following expression of the self-correlation function $R_{xy}(k,1)$ is recalled:

$$R_{xy}(k,1) = \frac{\Sigma\Sigma (x(i,j) - \bar{x})(y(i+k,j+1) - \bar{y})}{[\Sigma\Sigma (x(i,j) - \bar{x})^2 \Sigma\Sigma (y(i+k,j+1) - \bar{y})^2]^{1/2}}$$

In the expression indicated, to limit the computations, we have deliberately restricted the field of computation of the function R to the eight points marked by a cross, in the near periphery of the potential landmark to be characterized, $P_1$. This means that, in this expression, x and y can vary only by values that are successively equal to $-2$, 0 and $+2$. The directly nearby points for which this variation equals 1 have been overlooked. Naturally, a wider field and/or a more complex function of self-correlation could have been chosen. Experience has shown that the choice proposed herein, while being simple, is efficient. The physical significance of the self-correlation lies in helping in the determination of well-marked gray level peaks. For, if a peak is too weakly marked, if for example the point $P_1$ is the only one to have a high gray level, and if its immediate surroundings have a common level, it could be determined, with a result of the computation of the low self-correlation function, that the point is not likely to be a good landmark. The self-correlation function thus estimated is standardized. It does not depend on the levels of luminosity $n_1$ themselves. This self-correlation function is taken to have a decreasing form that can be approximated by a decreasing exponential function. The damping coefficient a of this decreasing exponential function, which can be likened to a time constant, represents the self-correlation. The greater a is, the more this will mean that the landmark is worthwhile or useful. It can be shown that, by a conventional least squares method of approximation, this damping coefficient a will be given by the following expression:

$$a = - \sum_{\substack{l\in[-2,0,2] \\ k\in[-2,0,2]}} \sqrt{k^2 + l^2} \cdot Ln(R_{xy}(k,l)) / \sum_{\substack{l\in[-2,0,2] \\ k\in[-2,0,2]}} \sqrt{k^2 + l^2}$$

In this expression, Ln designates the Neperian logarithm of the self-correlation function $R_{xy}$. It is further noted that the denominator of the computation of a is constant for k and 1 chosen, and that it may be computed once and for all.

Having computed these magnitudes at each point, we then constructed a polynomial expression with the following form:

$$Y = B_0 + B_1X_1 + B_2X_2 + B_3X_3 + B_4X_4 + B_5X_5$$

In this expression, $B_1$ to $B_5$ are coefficients weighting the magnitudes $X_1$ to $X_5$, $B_0$ is a constant. Furthermore, a magnitude Z is determined. This magnitude Z is the standard of the difference between the shift vector and the estimation of the shift done by the measurement. We sought to establish a regression between this value Z and the characters $X_i$ in minimizing the function $(Y-Z)^2$. We then sought to show (by a premonition related to the invention) that the magnitude Y is correlated to the error made on the estimation of the shift. Thus, a linear regression was established between $Z = |V - \hat{V}|$ (where V is the true shift and $\hat{V}$ the estimated shift) and the characters $X_1, X_2, \ldots X_5$. This regression was established by means of a population of points taken on a test set of pairs of perfectly reset images. In practice, about a thousand measuring points were taken, for which the $X_1, X_2, \ldots X_5$ and $|V - \hat{V}|$ were computed. The regression enabled the computation of the coefficients $B_0$ to $B_5$. The coefficient of multiple regression as well as the Student and Fisher tests have shown that the regression is significant and, therefore, that the characteristics $X_O$...$X_5$ enable a prediction of the error which would be made in choosing a potential landmark. In one example, corresponding to angiography images, it was possible to calculate that the values of $B_i$ could take the following values: $B_O=0.5$; $B_1=4.8$; $B_2=B_3=B_4=0$ and $B_5=-2.7$. The taking into account of $X_2X_3X_4$ was overlooked in this example from angiography, in order to limit the computations.

Another valuable feature of the invention is that it proposes a choice of landmarks which respect to the homogeneity of the distribution of these landmarks in the image. FIG. 3 makes it possible to explain how, in the invention, the homogeneity of the distribution of the landmarks is respected. The image $I_1$, in its finest resolution (512×512), can be sub-sampled according to a known method of the so-called quadtree type. According to this method of sub-sampling, whatever a given level of resolution may be, for example M+2 in which a window $W_2$ has four landmarks, this window may be sub-sampled, at a level M+1, in a single window $W_1$ having no more than one landmark. Then the window $W_1$, with three of its neighbors, may again be sub-sampled or agglomerated so as to give the level M a window $W_O$ having no more than one landmark instead of the four landmarks contained at the level M+1 of the sixteen landmarks contained at the level M+2. Continuing thus, it is seen that, at each sub-sampling level, there is only one landmark in each of the windows of the image $I_1$. The distribution of the landmarks is then far more homogeneous than if, rather than choosing this hierarchical criterion, we had chosen only criteria of solidity in order to select the useful or worthwhile landmarks.

At the level 512×512, the number of potential landmarks is too great. To enable a first sorting out operation, in the invention we pay attention to only one of the magnitudes referred to previously: the magnitude $X_4$ represents the standard of the gradient.

FIG. 5 will make it possible to understand which of the landmarks, represented by small circles at a level M+2, will be automatically declared to be the victors of the agglomeration that leads to the resolution level M+1 (64), and will be represented by small circles that are now crossed. Among four landmarks selected hierarchically at the level M+1, it is then possible to automatically find that landmark which will survive at the preferred level M and is marked by a double circle with a cross. Thus, the windows having the landmarks 16 to 19 are agglomerated in a single window at the level M+1 with the landmark 19 as the corresponding landmark. In the same way, the landmark 19 will be agglomerated with landmarks 20 to 22, at one and the same level M+i as itself, to give the landmark 22 as the victorious landmark at the level M. If, in the rest of the image, we proceed identically, it is seen that the homogeneity of the distribution of the landmarks is maintained.

The criterion of agglomeration at the instant of a transition in level (between the level M+2 and the level M+1 for example), is preferably a criterion of minimization of a so-called transition cost formed by a term measuring the homogeneity of the distribution of the landmarks, on the one hand, and a term measuring the solidity of the candidate landmarks on the other hand. In practice, this cost function could be written as follows:

$$C = \alpha C_h + \beta C_r \qquad 6$$

In this expression, $\alpha$ and $\beta$ are coefficients that can be taken to have any values. To simplify the description, they are both taken to be equal to 1. $C_h$ and $C_r$ are, respectively, a term measuring homogeneity and a term measuring the solidity of the candidate landmark. In practice, it will be determined that the term $C_r$ is the reverse of Y for the candidate landmark, and that $C_h$ is the distance of the candidate landmark of a cell at a stage Q (M+2) from the center of the cell of the stage Q−1 (M+1) from which it has come. For example, the cost of homogeneity of each of the potential landmarks 16 to 19 is the distance between each of these landmarks and the center 23 of the cell that agglomerates them. In other words, at the time of the agglomeration, the landmarks are not chosen solely according to their solidity but also according to their homogeneity. In practice, this means that there is no point in having a population of very solid landmarks if these landmarks are confined in a region of the image where, unfortunately, the significance of an image is of little importance to the person viewing it. Naturally, to make a choice, from among the four landmarks 16 to 19, of that landmark which will be the victor, we take the landmark for which the cost function C will be the lowest. This means that, in this expression, the solidity and homogeneity are appreciated in reverse: a greater solidity naturally leads to lower homogeneity and vice versa. By choosing the minimum, we are thus sure of obtaining an optimum, depending on the coefficients $\alpha$, $\beta$ between these two criteria.

After having chosen, at the level M+2, that landmark which, among the potential landmarks, had been chosen (in taking the one for which Y is the lowest), we select, at the level M+1, that landmark from among the chosen landmarks which has the lowest transition cost. At the level M+1, we then proceed to make an estimation of the shift vectors to be assigned to each of the landmarks chosen at this level. In a subsequent and specific step of the invention, a validation shall be done, in an additional operation of agglomeration, to reach the level M, of the landmarks chosen at the level M+1 with their shift vectors so as to get rid of the landmarks for which the shift vectors would show aberrations. In a known way, the shift vector v measured at the position of each of the landmarks will be obtained by a known operation of cross-correlation for which the expression is given here below:

$$V = (k, 1) \text{ for the max of } T(k, 1), \text{ such that max } T(k, 1) = \sum_{x,y} n_1(x,y) * n_2(x+k, y-l)$$

In this expression, v is the shift vector at the position of the landmark.

In making a search, in the image $I_2$ of FIGS. 6a and 6b, for the pair of coordinates k and 1 for which the cross-correlation function T(k,1) is the maximum, we determine the correspondents 25 of the projection 26 in the image $I_2$ of the computed landmarks 27 in the image $I_1$. The vector v connecting 26 to 25 measures the shift undergone by the image of the structures corresponding to the point 27 at the instant when the exposure of the image $I_2$ is taken. The vector v is thus estimated by cross-correlation.

FIG. 7a gives, as an example, a representation of the result of the computation by cross-examination of the shift vectors. It may be thought that an additional agglomeration, to go from the level M+1 to the level M, could lead to a choice, as a useful or worthwhile landmark, of that landmark for which the shift vector 28 in FIG. 7b has a clearly aberrant character with respect to its neighbors. In the invention, in this additional agglomeration to go to the preferred level M, the landmarks are then filtered as a function of the shape of their shift vector. The four shift vectors corresponding to these landmarks to be agglomerated have coordinates, respectively $(k_1, l_1)$ to $(k_4, l_4)$. By filtering, it is possible to compute a mean vector with coordinates k and l such that k is the mean of $k_1$ to $k_4$ and such that l is equal to the mean of $l_1$ to $l_4$. In practice, this means that the four shift vectors 29 to 32 of FIG. 7a have, as their image, a mean vector 28 on FIG. 7b. In the invention, we further make a computation, in a neighborhood of 3×3 cells at the level M, of the mean 33 (at the level M) of the means (at the level M+1) of the shift vectors. Thus, for the computation of the value of the vector 33, the neighboring mean shift vectors 34 to 41 and 28 are used. Just as the mean of the means was computed for the vector 33, it is possible to compute the variances of the means for one and the same neighborhood of 3×3 cells. We then compute the standard of the difference between the mean vector 28 and the mean 33 of the means of the vectors of the neighborhood. If this standard is greater than a determined proportion K of the variance, it is determined therefrom that the filtered vector is the mean vector: the vector 33. On the other hand, if this norm is not greater than a pre-determined fraction K of the variance, the measured vector $3_1$ is chosen as a filtered vector. As it happens, this is what takes place in FIGS. 7a to 7d where, at the level M, we have chosen the shift vector 31, having the same direction as the vector 33 because, in the concerned cell, the vectors 29, 30 and 32 together seemed to indicate a certain coherence of the distortion. K is a constant regulating the severity of the test. In FIG. 7a, we have chosen the vector 31 because it is the vector that most closely approaches the filtered vector 33 chosen for the cell considered.

In other words, for the passage from the level M+1 to the level M, ultimately a filtered vector is computed and the landmark chosen is the one for which the shift vector most closely approaches the filtered vector. We thus obtain a regular field of final vectors without being obliged to impose this regularity by a sudden filtering of the measurements. Most of the final vectors are locally estimated vectors and not vectors adversely affected by filtering. This algorithm for the selection/validation of a bank of landmarks appears to be the essential element of a resetting algorithm. Associated with an efficient method for the estimation of the shift vectors, like the above-defined cross-correlation, this hierarchical approach makes it possible to obtain a consistent field of sufficiently dense vectors, uniformly distributed and not too difficult to compute by the cross-correlation operation since they are small in number.

The local estimation of the shift is done by a computation of a cross-correlation among images. To do this (FIG. 8), we shift a window of measurement marked W, centered on a landmark of the image $I_1$ before a search zone, marked S, of the image $I_2$. For each position of the image W in S, we compute the cross-correlation function. This is equivalent to defining a surface, the points of which are identified by coordinates k, l, of a proposed shift vector. The position of the maximum of this surface gives an estimation of the shift to be associated with the central point of the window W. In order to simplify the complex operations of cross-correlation, the computation is done on binary images $I_1$ and $I_2$ and, hence, in discrete spaces. The shifts obtained are then given in whole numbers of pixels A binary image is obtained by using the images deduced at the time of the pre-processing by a threshold operation on the gradient. A bit 1 is assigned to the chosen image points and a bit 0 is assigned to the image points that are not chosen. It can be shown that, under these conditions, computing the cross-correlation amounts to performing the following operation:

$$T(k,l) = \sum_{x \in w}^{y \in w} n_1(x,y) * n_2(x+k, y+l) / \sum_{x \in w}^{y \in w} n_2(x+k, y+l)$$

In this expression, n represents the binary value 1 or 0 which replaces the gray level. It could be shown that the multiplication operation is very simple in this case since it amounts to performing a logic AND operation.

As stated further above, the value of the shift to the maximum is given as a whole number of pixels since it is precisely determined by the position of a point. Preferably, a fractional value of the shift vector will be achieved (to make the corrections more precise) by computing the interpolated value around the entire position of the maximum. Preferably, this interpolated position is approximated by a quadric. We then write:

$$T(X,Y) = Ax^2 + By^2 + Cxy + Dx + Ey + F \qquad 9$$

We know that the function T is known when x and y are whole number values. In choosing a certain neighborhood, for example one of nine points, around the peak in whole-number coordinates, we are led to nine equations for only six unknowns: the six parameters A to F. An approximation is made, by a least squares regression, of the values of the six parameters A to F. And it is then determined that the maximum of the quadric is at the coordinates X0Y0 given by the following formulae:

$$X_O = (-2BD + CE)/(4AB - C^2) \qquad 10$$

$$Y_O = (-2AE + CD)/(4AB - C^2)$$

$X_O$ and $Y_O$ are fractions of units: the real shift vector of the landmark is the algebraic sum of whole number and fractional coordinates. To restore the offset mask image $I_2$, it is necessary to know the shift vector associated with each pixel of $I_2$. This shift, which is sometimes called an optical flow, is computed by interpolation of its components Vx and Vy. It is therefore necessary to compute Vx(x, y) and Vy(x, y) for each of the 512×512 points of the mask image from the measurements $V_x$ and $V_y$ on the $M^2$ landmarks validated at the level M. We are thereby led to the interpolation of two surfaces $V_x$ of (x, y) and $V_y$ (x y) from an irregular meshing of known values. For, the known values are irregularly distributed since the landmarks chosen at the level M have no reason to be at the center of the cells. We then proceed by triangulation of the space and interpolation on each triangle by a first degree (plane) or fifth degree bivariate function to find the coordinates of the shift vectors at the center of the cells. The fifth degree interpolation makes it possible to achieve the continuity of the drifts on the sides of the triangles. This technique is known and described in the state of the art in H. AKIMA, *ACM Transactions Math Software* 4, June 1978, pages 148-159, "A method of bivariate interpolation and smooth surface filling for irregularly distributed data points".

Having the shift vector of each pixel, it is necessary to apply this vector in order to obtain a reset image $I_3$. In practice, the reset image is constructed by computing the gray levels at each point of the fine sampling matrix $N \times N$ (512×512). The gray level of a pixel (x, y) of the reset image $I_3$ is the gray level located at $(x-Vx, y-Vy)$ of the mask image. Since the shift (Vx, Vy) is not a whole number value, the point that should be looked for is not located on the sampling matrix. Its value is then estimated by interpolation on its four neighbors.

What is claimed is:

1. A method for the automatic resetting of images wherein a resetting is done of a second image, called a mask image, distorted with respect to a first image, called a reference image, each image having points and being defined as a collection of addresses of these points, each address being associated with a gray level, said method including the following steps:
    a selection is made, preferably in the first image, of a set of landmarks;
    a search is made for the correspondents of these landmarks in the second image;
    an estimation is made of the shifts undergone by the selected landmarks of the first image with respect to the corresponding searched-for landmarks of the second image;
    one of the images, preferably the second image, is restored by correcting the position or the gray level of the points of this image in taking into account the shifts of the landmarks located in the neighborhood of these points;
    wherein, to make the selection,
    an assigning is done, to points of the first image, of a computed magnitude or of computed magnitudes characteristic of the solidity and of the homogenity of distribution of points of this image liable to act as landmarks;
    a sorting-out is done of the landmarks to be chosen as a function of the meeting of a criterion by a combination of the magnitudes at these points;
    wherein, to do the sorting out,
    a computation is made, at these points, of at least one of the following five magnitudes:
    *$X_1$: the difference, preferably standardized, between the two images in the means of the gray levels, these means being computed in each of the two images on a population of points contained in windows framing considered superimposable points;
    *$X_2$: the standard deviation of the gray levels of a population of points located in a window framing, in the first image, a landmark to be characterized;
    *$X_3$: the useful value of Moravec for the points, to be characterized, of the first image;
    *$X_4$: the standardized value of the gray level gradient, computer on a landmark to be characterized in the first image;
    *$X_5$: the value (a) of the damping coefficient of the self-correlation function modelized by an exponential function, at the position of the landmark to be characterized.

2. A method according to claim 1 wherein the landmarks are sorted out as a function of a combination of magnitudes, this combination being expressed analytically as a function of these magnitudes, coefficients $B_O$, $B_1$, $B_2$, $B_3$, $B_4$ and $B_5$ of this combination being determined by a statistical, analytical assessment on a population of images of one and the same type, the characteristics of restoration of which are already known.

3. A method according to either of claims 1 or claim 2, wherein, wherein the coefficients have the following values: $B_O=0.5$, $B_1=4.8$ and $B_5=-2.7$ when the combination concerns the two magnitudes $X_1$ and $X_5$.

4. A method according to claim 1 wherein:
    the landmarks are selected hierarchically, according to a quadtree method, in performing an iterative sub-sampling (M+1) of the landmarks of the first image selected for a given resolution (M+2) of this first image.

5. A method according to claim 4, wherein:
    an assessment is made, at the sub-sampled level, of the distribution of the landmarks and of their solidity, and
    the landmarks are selected by choosing a minimum of an analytical function of transition cost for which this distribution and this solidity are the variables.

6. A method according to either of the claims 1 or 2 wherein, to make the selection, one and the same number of landmarks is chosen for each window of a set of related windows covering the first image.

7. A method according to claim 6, wherein a second sub-sampling, following the first one, is done by filtering the consistent landmarks for which the associated shift vector, computed by another way, is the most coherent with respect to its neighbors.

8. A method according to claim 1 wherein the shifts are estimated by cross-correlation and wherein the fractional shifts involved are sought by approximation by a quadric.

* * * * *